United States Patent [19]

Krolak et al.

[11] 4,023,625
[45] May 17, 1977

[54] STRUCTURE MOUNTING A BULLDOZER ASSEMBLY TO A VEHICLE

[75] Inventors: Ronald L. Krolak, Morton; George F. Alexander, Pekin; Eldon D. Oestmann, Morton, all of Ill.

[73] Assignee: Caterpillar Tractor Co., Peoria, Ill.

[22] Filed: Sept. 5, 1975

[21] Appl. No.: 610,705

[52] U.S. Cl. .............................. 172/809; 172/801; 180/68 P; 308/22; 403/58; 403/165; 403/361; 403/378

[51] Int. Cl.² ................... E02F 3/76; A01B 71/04; A01B 71/08

[58] Field of Search .......... 172/801, 802, 803, 804, 172/805, 806, 807, 808, 809; 180/68 R, 68 P; 308/15, 22; 403/57, 58, 165, 361, 378; 115/24.6

[56] References Cited
UNITED STATES PATENTS

| | | |
|---|---|---|
| 772,264 | 10/1904 | Wheeler ........................... 115/24.6 |
| 813,762 | 2/1906 | Anderson ......................... 115/24.6 |
| 2,775,831 | 1/1957 | Rockwell ........................... 172/803 |
| 2,867,922 | 1/1959 | Allin ................................. 172/809 |
| 2,965,187 | 12/1960 | Zeman ........................... 172/809 X |
| 3,572,446 | 3/1971 | Mazzarins ......................... 172/804 |
| 3,825,074 | 7/1974 | Stedman et al. .................... 172/803 |
| 3,834,478 | 9/1974 | Alexander et al. ................ 180/68 P |

Primary Examiner—Richard T. Stouffer
Attorney, Agent, or Firm—Wegner, Stellman, McCord, Wiles & Wood

[57] ABSTRACT

Structure for mounting a bulldozer assembly to a vehicle, such as a tractor. The mounting structure includes lift jacks connected to a radiator guard extending about the vehicle engine coolant radiator. The mounting structure includes a portion connected to the lift jacks and a portion received in a socket provided in a corner portion of the radiator guard. The mounting structure includes structure for removably securing the same to the radiator guard.

12 Claims, 4 Drawing Figures

U.S. Patent   May 17, 1977   Sheet 1 of 2   4,023,625
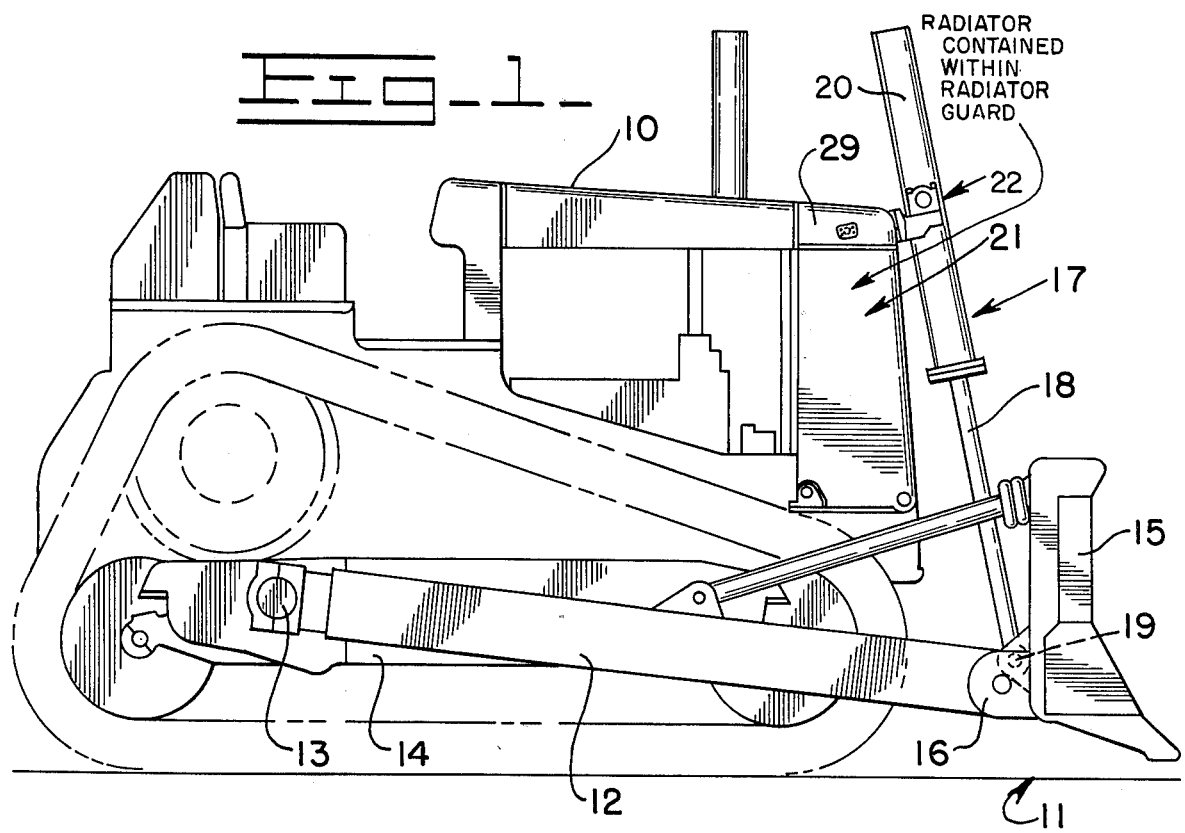
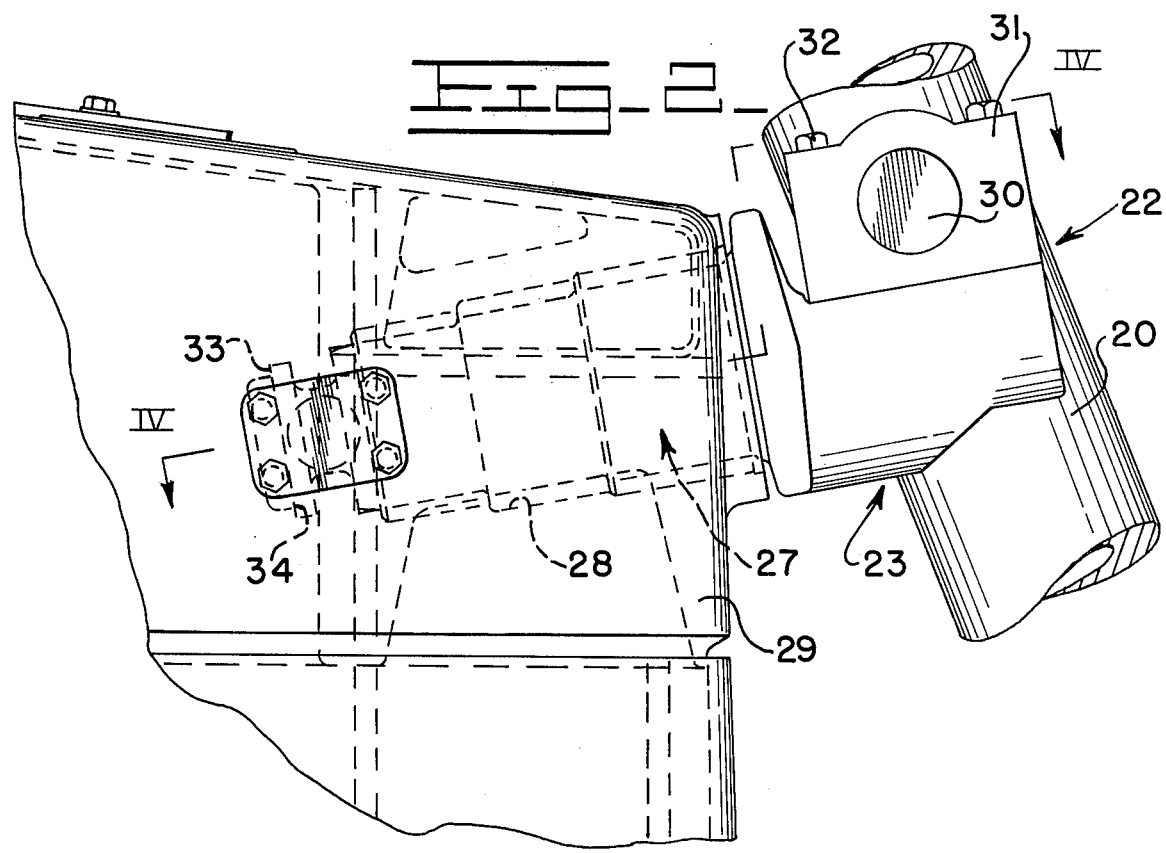

U.S. Patent  May 17, 1977  Sheet 2 of 2  4,023,625
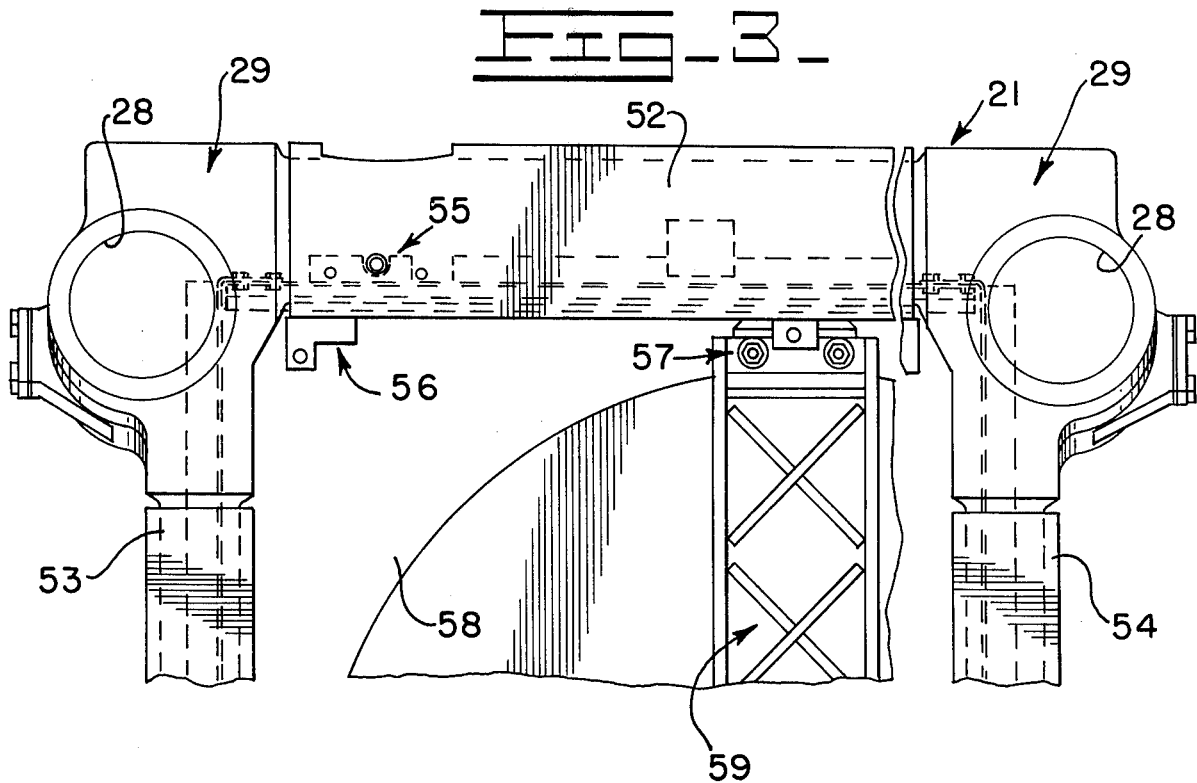
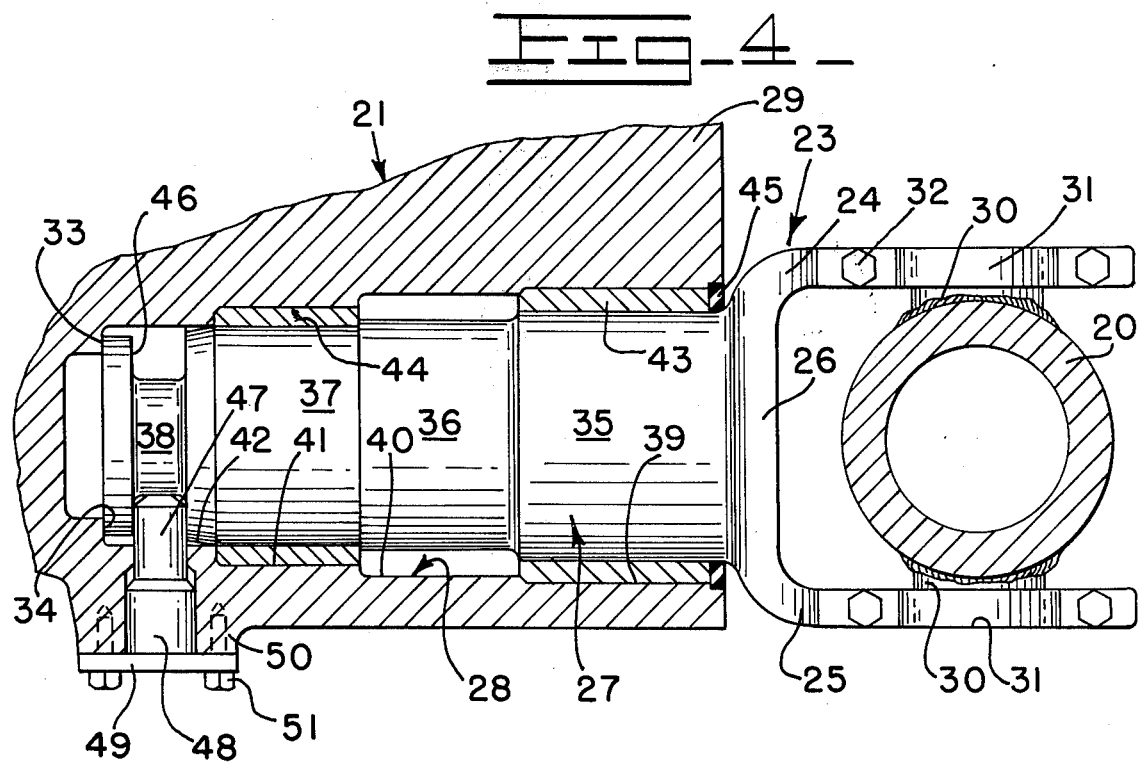

STRUCTURE MOUNTING A BULLDOZER ASSEMBLY TO A VEHICLE

BACKGROUND OF THE INVENTION

1. Field of the Invention

This invention relates to mounting structures and in particular to structures for mounting a bulldozer assembly to a vehicle, such as a tractor.

2. Description of the Prior Art

In U.S. Letters Pat. No. 3,825,074 of Robert N. Stedman et al., owned by the assignee hereof, means are disclosed for mounting a bulldozer assembly to a tractor wherein universal joints are disposed on opposite sides of an open box cross frame internally containing a heat exchanger system of the tractor. The universal joints are mounted to the box frame side members substantially below the upper end thereof and extend laterally outwardly from the opposite sides of the box frame.

In U.S. Letters Pat. No. 3,834,478, of George F. Alexander et al., owned by the assignee hereof, a guard is provided which, together with the heat exchanger, is pivotably mounted to be swung as a unit away from the power unit of the tractor such as to provide service access to the power unit.

In U.S. Letters Pat. No. 2,965,187 of Bernard L. Zeman, a tiltable engine guard is provided for use on a tractor which is also adapted to serve as a support for the lift mechanism used to raise and lower the bulldozer blade. The bracket structure mounting the hydraulic jack is attached to the side plate of the guard.

In another form of jack mounting means, brackets are provided on cross tube supports which tend to retard the flow of cooling air through the radiator.

The use of external jack mounting brackets has been found to raise several additional problems, including the undesirable obstruction of the operator's vision forwardly of the tractor, as well as the occasional blocking or jamming of debris inwardly and forwardly of the track chains.

SUMMARY OF THE INVENTION

The present invention comprehends an improved means for mounting a bulldozer assembly in a vehicle, such as a tractor. The invention comprehends mounting the bulldozer assembly jacks to a corner portion of the radiator guard. In the illustrated embodiment, the corner portion of the guard comprises a separate casting which is welded to an upper cross portion of the guard and the downwardly extending side portion of the guard.

Facilitated installation of the jack mounting means is provided by mounting a pivot portion of the jack mounting means in a socket defined by the corner portion of the guard. In the illustrated embodiment, the socket extends forwardly at an upward angle to the horizontal. The mounting means may comprise a yoke which further carries between the arms thereof a second pivot to provide, in cooperation with the pivot portion in the corner portion socket, a universal mounting of the jack for improved lift ing of the bulldozer assembly.

The pivot portion of the mounting structure may be removably retained in the socket by means engaging an annular groove in an inner end portion thereof. The pivot portion of the mounting means may comprise a pivot stepped complementarily to a stepped socket configuration and suitable annular bearings may be provided at spaced, stepped portions of the pivot for freely rotatively mounting the pivot in the socket.

As the jack mounting means are disposed at the corners of the radiator, and more specifically may be disposed laterally of the space above the radiator, and as the mounting means does not project outwardly or upwardly to obstruct the tractor operator's vision, improved facilitated operation of the tractor is provided.

The present jack mounting means provides a rigid mounting structure obviating the need for additional support members. The use of the upwardly inclined socket mounting means permits facilitated installation and removal of the mounting means when desired while yet the mounting means may be effectively positively locked in pivotal association with the radiator guard in normal use.

Further, as the socket means may be disposed substantially vertically above the side walls of the radiator guard, maximum structural integrity of the apparatus is obtained over the entire range of jack and bulldozer operation.

BRIEF DESCRIPTION OF THE DRAWING

Other features and advantages of the invention will be apparent from the following description taken in connection with the accompanying drawing wherein:

FIG. 1 is a side elevation of a tractor having an improved means embodying the invention for mounting the lift jacks of the bulldozer assembly;

FIG. 2 is a fragmentary enlarged elevation of a portion of the apparatus illustrating more specifically the mounting of the jack mounting means to the radiator guard;

FIG. 3 is a fragmentary front elevation of the radiator and radiator guard means with the jacks and jack mounting means removed therefrom; and FIG. 4 is a fragmentary enlarged section taken substantially along the line 4—4 of FIG. 2.

DESCRIPTION OF THE PREFERRED EMBODIMENT

In the exemplary embodiment of the invention as disclosed in the drawing, a crawler-type tractor generally designated 10 is provided with a bulldozer assembly generally designated 11 having push arms 12 mounted by pivots 13 to a frame 14 of the tractor. The bulldozer blade 15 is movably mounted by a pivot 16 to the front end of the push arms. The front end of the push arm and bulldozer blade is supported by a pair of lift jacks 17 having a connecting rod 18 connected to the bulldozer blade by a pin connector 19.

Each jack further includes a cylinder 20 which is universally adjustably mounted to a radiator guard 21 by a mounting structure generally designated 22. The radiator guard may be tiltably mounted to the tractor frame generally in the manner shown in the above indicated Alexander et al. U.S. Pat. No. 3,834,478.

The present invention, as indicated briefly above, comprehends an improved mounting structure 22 and radiator guard configuration providing improved mounting of the bulldozer blade in the tractor by means of jacks 17.

More specifically, as best seen in FIGS. 2–4, each mounting means 22 includes a yoke 23 having a pair of forwardly spaced arms 24 and 25. The bight 26 of the yoke is provided with a rearwardly projecting pivot 27 adapted to be rotatably received in a socket 28 in a corner portion 29 of radiator guard 21.

As best seen in FIG. 4, the jack cylinder 20 may be provided with a pair of trunnions 30 journaled in bearings 31 secured to the yoke arms 24 and 25 by suitable means, such as screws 32. Thus, jack cylinder 20 may pivot about the horizontal axis of trunnions 30 and about the axis of pivot 27 to provide a universal mounting of the jacks.

As best seen in FIG. 2, socket 28 extends forwardly at an upwardly inclined acute angle in guard corner portion 29. Thus, yoke pivot 27 may be readily installed in the socket by simple slight downward, rearward insertion thereof to bring a rear end surface 33 of the pivot against a stop shoulder 34 on corner portion 29 at the inner end of the socket. As shown in FIG. 4, pivot 27 is stepped to define four successively smaller pivot portions 35, 36, 37, and 38. Socket 28 is correspondingly stepped to define socket portions 39, 40, 41 and 42. Sleeve bearings 43 and 44 may be provided in socket portions 39 and 41, respectively, for rotatively journaling the pivot. A seal 45 may be provided at the outer end of socket portion 39.

Inner pivot portion 38 is provided with an annular groove 46 for receiving the inner end 47 of a lock pin 48. Lock pin 48 may further be provided with an outer enlarged flange 49 adapted to be secured to a boss 50 on radiator guard corner portion 29, by suitable means, such as screws 51 for removably retaining the lock pin portion 47 in groove 46 to provide axially fixed rotative retention of pivot 27 in the socket.

As best seen in FIG. 3, radiator guard 21 includes a pair of such corner portions 29 at opposite ends of a cross portion 52 and at the upper end of a pair of side portions 53 and 54, respectively. The corner portions may comprise individual castings having sockets 28 formed therein and the corner portion castings may be secured to the cross portion and side portions of the guard by suitable means, such as welding. The guard may further carry suitable attaching means generally designated 55, 56 and 57 for mounting fan baffle segments 58, fan and drive support struts 59, etc., in the assembly.

By providing the means for mounting the jack yoke to the radiator guard effectively internally of the guard so as to provide an effectively flush mounting thereof, maximum strength is obtained without the need for expensive reinforcing elements, double wall construction, etc., as required in the prior art. Further, the effective recessing of the mounting means within the radiator guard provides improved operator visibility. Still further, by mounting the jacks laterally of the radiator, blocking and jamming of debris inwardly and forwardly of the tractor chains is effectively minimized. The readily removable mounting of the jacks to the radiator guard further provides for improved facilitated installation and servicing of the apparatus.

The foregoing disclosure of specific embodiments is illustrative of the broad inventive concepts comprehended by the invention.

We claim:

1. In a vehicle having a frame, an engine coolant radiator carried on said frame, and a bulldozer assembly pivotally carried on said frame, the improvement comprising: a radiator guard for protecting said radiator, said guard having corner portions adjacent the upper lateral corners of the radiator, each said corner portion defining a forwardly opening socket formed integrally therein, said radiator guard defining a rigid U-shaped assembly further including side portions and an upper cross portion, said corner portions being secured to the opposite ends of the cross portion and to the upper end of the side portions; and lift jack means having portions connected to said bulldozer assembly and mounting portions received in said sockets for adjustably mounting the lift jack means to said radiator guard.

2. The structure of claim 1 wherein said sockets open at an acute angle to the horizontal from said guard corner portions.

3. The structure of claim 1 wherein said lift jack means mounting portions comprise yokes having pivot portions rotatably received in said sockets.

4. The structure of claim 1 wherein said lift jack means mounting portions comprise yokes having pivot portions rotatably received in said sockets and spaced mounting arms, and trunnion bearings carried by said yoke mounting arms for providing universal adaptable mounting of the lift jacks to the radiator guard.

5. The structure of claim 1 wherein said radiator guard corner portions comprise castings having said sockets cast integrally therein.

6. The structure of claim 1 further including means for releasably locking said mounting portions against withdrawal from said sockets.

7. The structure of claim 1 wherein said lift jack means mounting portions comprise yokes having pivot portions rotatably received in said sockets and spaced mounting arms, and means removably secured to said yoke mounting arms for providing universal adaptable mounting of the lift jacks to the radiator guard.

8. The structure of claim 1 wherein said radiator guard comprises a fabricated assembly including weld means securing said corner portions therein.

9. The structure of claim 1 wherein said sockets and mounting portions are complementarily stepped.

10. The structure of claim 1 wherein said sockets and mounting portions are complementarily stepped and annular bearing means are provided at spaced stepped portions thereof.

11. The structure of claim 1 wherein said sockets and mounting portions are complementarily stepped and annular bearing means are provided at spaced stepped portions thereof, said structure further including means rearwardly of the bearing means for releasably locking said mounting portions against withdrawal from said sockets.

12. The structure of claim 1 wherein said corner portions are disposed laterally of the space above the radiator.

* * * * *